United States Patent
Madaiah et al.

(10) Patent No.: US 10,225,121 B2
(45) Date of Patent: Mar. 5, 2019

(54) COMMUNICATION SYSTEM AND METHOD FOR ACHIEVING LOW PEAK-TO-AVERAGE POWER RATIO

(71) Applicant: TEJAS NETWORKS LTD., Bangalore (IN)

(72) Inventors: Vinod Kumar Madaiah, Karnataka (IN); Rohith C. Aralikatti, Karnataka (IN)

(73) Assignee: TEJAS NETWORKS LTD., Bangalore (IN)

( * ) Notice: Subject to any disclaimer, the term of this patent is extended or adjusted under 35 U.S.C. 154(b) by 43 days.

(21) Appl. No.: 15/262,982

(22) Filed: Sep. 12, 2016

(65) Prior Publication Data

US 2017/0078127 A1 Mar. 16, 2017

(30) Foreign Application Priority Data

Sep. 11, 2015 (IN) .......................... 4844/CHE/2015

(51) Int. Cl.
*H04W 4/00* (2018.01)
*H04L 27/26* (2006.01)
*H04B 1/04* (2006.01)

(52) U.S. Cl.
CPC ....... *H04L 27/2614* (2013.01); *H04B 1/0458* (2013.01); *H04L 27/2637* (2013.01); *H04L 27/2601* (2013.01)

(58) Field of Classification Search
None
See application file for complete search history.

(56) References Cited

U.S. PATENT DOCUMENTS

| | | | | |
|---|---|---|---|---|
| 2003/0142754 A1* | 7/2003 | Jung | ................... | H04L 27/2614 375/260 |
| 2006/0247898 A1* | 11/2006 | Cha | ...................... | H04L 27/2614 702/188 |
| 2007/0217329 A1* | 9/2007 | Abedi | ................. | H04L 27/2614 370/208 |
| 2008/0159421 A1* | 7/2008 | Chen | ................... | H04L 27/2614 375/260 |
| 2010/0165829 A1* | 7/2010 | Narasimha | .......... | H04L 27/2614 370/210 |
| 2016/0094318 A1* | 3/2016 | Shattil | ..................... | H04B 7/026 375/267 |
| 2016/0254889 A1* | 9/2016 | Shattil | ................... | H04L 5/0035 370/329 |

* cited by examiner

*Primary Examiner* — Anh Vu H Ly
(74) *Attorney, Agent, or Firm* — Marshall, Gerstein & Borun LLP

(57) ABSTRACT

The present disclosure relates to transmission of information across a communication channel efficiently and without error. The present disclosure also enables transmission of information across a communication channel such that the Peak to Average Power Ratio (PAPR) is one (zero in decibels). The present disclosure also enables transmission of information across a communication channel such that the information transmitted is present only along a finite number of orthogonal frequencies. The present disclosure also combines advantages of both Single-carrier Transmission (SCT) and Multi-Carrier Transmission (MCT) systems (e.g. Orthogonal Frequency Division Multiplexing (OFDM) systems).

14 Claims, 6 Drawing Sheets

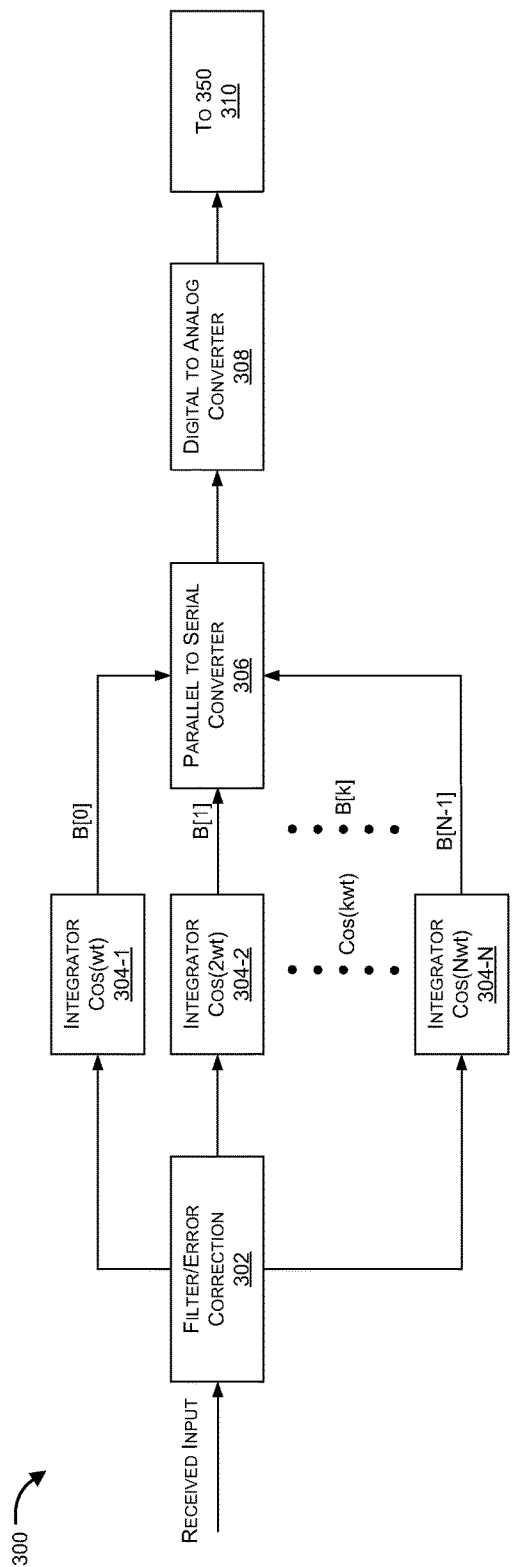
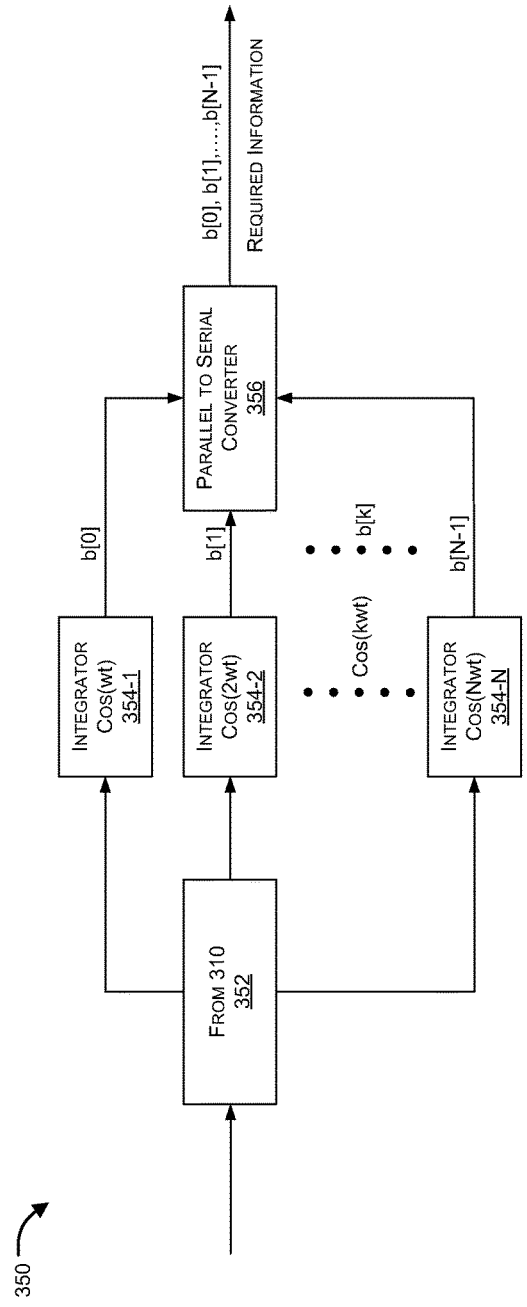

COMMUNICATION SYSTEM AND METHOD FOR ACHIEVING LOW PEAK-TO-AVERAGE POWER RATIO

TECHNICAL FIELD

The present disclosure generally relates to a wireless communication system that provides lower peak to average power ratio (PAPR). In particular, the present disclosure pertains to communication systems and methods for achieving low peak to average power ratio (PAPR) for transmitted symbols of wireless devices.

BACKGROUND

Background description includes information that may be useful in understanding the present invention. It is not an admission that any of the information provided herein is prior art or relevant to the presently claimed invention, or that any publication specifically or implicitly referenced is prior art.

As new applications and services are being offered/consumed over wireless devices, there is an increasing need for high data rate in order to provide better customer satisfaction. At present, there are several communication standards such as orthogonal frequency division multiplexing (OFDM), single carrier-frequency division multiple access (SC-FDMA), and discrete Fourier transform pre-coded orthogonal frequency division multiple access (DFT-pre-coded-OFDMA), among others that aim to achieve high data rates. In wireless communication standards such as OFDM and OFDMA, a signal is "spread out" and distributed among subcarriers, which send portions of the signal in parallel. High data rate is achieved by sending a signal in parallel over all possible channels available between the sender device, interchangeably referred to as transmitter hereinafter, and the receiver device, interchangeably referred to as receiver hereinafter. To minimize interference and loss of data during transmission, subcarrier frequencies are chosen in such as a way that the modulated data streams are orthogonal to each other, and cross-talk between the sub-channels is eliminated so that inter-carrier guard bands are not required. At receiver side, the receiver receives and reassembles the data that is sent in parallel over different channels and/or sub-channels by the transmitter.

These existing standards, also interchangeably referred to as protocols hereinafter, that are in use today, suffer from a high peak-to-average power ratio (PAPR), where PAPR of the symbols being transmitted using any of these standards is very high. PAPR, which is ratio of Peak Power with respect to Average Power of all the symbols that will be or are transmitted by the transmitter, is a performance parameter for measuring performance and/or efficiency of any transmitter/transceiver. PAPR is therefore the ratio of Peak Power with respect to Average Power of all symbols that will be or are transmitted, wherein PAPR is a metric used to measure transmission efficiency of the RF power amplifier present within the Radio Transmitter. PAPR is the peak amplitude squared (giving the peak power) divided by the RMS value squared (giving the average power), also calculated as square of crest factor. PAPR is a metric used to measure transmission efficiency of the RF power amplifier that is present within a radio transmitter, wherein ideal PAPR value of transmitted symbols by any transmitter should be one, and a high PAPR value dictates use of a linear transmit chain to avoid signal distortion that results in degraded error performance and spectral re-growth beyond intended signal bandwidth. In particular, power amplifier (PA) characteristics of the transmitter exhibit a saturation of output power with increased input power and hence present a nonlinear behavior. To ensure linearity with high PAPR, PA of the transmitter is operated away from saturation, i.e. with a power back-off. Operating with a power back-off results in decreased transmission range of the transmitter and reduced power efficiency of the transmitter. Low PAPR value is also required for increased transmission range of the transmitter and to reduce the power consumption by the transmitter. By lowering the PAPR value, infrastructure cost for setting-up dense transmitter/transceiver network can also be controlled.

In existing Single Carrier Transmission (SCT) systems, transmitted signal or waveform is band limited but consists of infinite frequencies, where these infinite frequencies present within the band can be called as 'Sub-carriers' to differentiate between the high-frequency 'Carrier' that is used for modulation by the signal. These infinite sub-carriers lead to significant interference between different or adjacent sub-carriers or frequency channels or frequency components and leads to errors, e.g. Inter-Symbol Interference (ISI). On the other hand, in Multi Carrier Transmission (MCT) systems, the transmitted signal or waveform is band-limited and there are a finite number of sub-carriers or frequency channels or frequency components. However, the Peak-to-average Power Ratio (PAPR) is very high. For instance, in Orthogonal Frequency Division Multiplexing (OFDM) system, which is an example of MCT systems, the transmitted signal or waveform is band-limited and there are a finite number of sub-carriers or frequency channels or frequency components that are all orthogonal to each other. Orthogonality reduces cross-talk between different frequency components, however, the Peak-to-average Power Ratio (PAPR) is still very high.

As the cost of setting-up and maintenance of access points/transmitters is increasing, it is better to utilize transmitters to their maximum/optimal potential, and use existing transmitters in the most efficient manner possible, and hence one of the primary objectives for any wireless communication scheme is to lower the PAPR of the transmitted symbols.

In prior art solutions, in order to achieve better PAPR, different techniques have been proposed including coding techniques, constellation reshaping, tone-reservation, and selective mapping, to name a few. For instance, amplitude clipping can be directly applied to reduce the PAPR. However, this clipping results in in-band and out-of-band distortions, which results in Symbol-Error-Rate (SER) degradation and out-of-band radiation respectively. To counter the effect of out-of-band distortions, a filter can be applied to the clipped signal. However, this might also regenerate new peaks. Hence, amplitude clipping reduces the PAPR at the expense of quantifiable distortion.

In another approach to reduce the PAPR, symbols are mapped into code words, and extra bit(s) are padded/added to those code words, and only code words that do not result in high PAPR are chosen for transmission. This technique requires lookup tables and exhaustive search for the best code word. Another approach known as selected mapping reduces PAPR by generating different sets of data blocks and transmitting one with the lowest PAPR. This is done by multiplying the initial data set with different phase sequences, and the optimal phase sequence is sent separately to the receiver as side information. A similar approach known as the Interleaving has also been used in past that uses interleaver instead of a set of phase sequences to produce different sequences of the same data and transmits the one with the minimum PAPR.

Some methods use extra tones to add a peak-reducing signal to the original multicarrier signal to reduce the overall PAPR. This signal can be stripped off at the receiver using the information available at the reserved tones. However, none of the foregoing techniques have proven entirely satisfactory.

Another similar technique is proposed in SC-FDMA standard that performs a Fourier transform on the signal before mapping and sending the signal over the subcarriers to send it through a serial transmission (rather than in parallel transmission as used by ODFM). On reception of the transmission, an inverse Fourier transform is performed. Though, the SC-FDMA scheme offers a lower PAPR than the OFDM and OFDMA, effectiveness and/or efficiency of SC-FDMA scheme is limited by the choice of mapping scheme employed. Performance of SC-FDMA also suffers due to serial transmission.

Though several techniques/schemes as cited above have been proposed in the past, none of the foregoing techniques have proven entirely satisfactory. Therefore, there still exists a need for communication systems and methods for achieving low PAPR values for symbols transmitted by any transmitter.

OBJECTS OF THE INVENTION

An object of the present disclosure is to transmit information across a communication channel efficiently and without error.

Another object of the present disclosure is to enable transmission of information across a communication channel such that the Peak to Average Power Ratio (PAPR) is one (zero in decibels).

Another object of the present disclosure is to enable transmission of information across a communication channel such that the information transmitted is present only along a finite number of orthogonal frequencies.

Yet another object of the present disclosure is to combine advantages of both Single-carrier Transmission (SCT) and Multi-Carrier Transmission (MCT) systems (e.g. Orthogonal Frequency Division Multiplexing (OFDM) systems).

SUMMARY

The present disclosure generally relates to a communication system that provides lower peak to average power ratio (PAPR). In particular, the present disclosure pertains to communication systems and methods for achieving low peak to average power ratio (PAPR) for transmitted symbols of computing devices.

In an aspect, communication system of the present disclosure can include a transmitter that can include a block generation module that can be configured to generate a plurality of blocks, each block comprising N symbols from a set of symbols received from a client layer. The transmitter can further include a first serial-to-parallel converter module that can be configured to transmit, for each block, each of the N symbols in parallel, and a first sample-and-hold based processing module that can be configured to receive the N symbols in parallel and generate an analog waveform from each of the N symbols of the respective block using N respective sample-and-hold blocks to generate N analog waveforms. The transmitter can further include a first modulation module that can be configured to modulate the N analog waveforms with respective N product modulators based on N respective sinusoidal waves of different frequencies to generate N modulated waveforms, and a first adder module that can be configured to sum the N modulated waveforms in a first adder to obtain a single analog waveform. The transmitter can further include a second serial-to-parallel converter module that can be configured to receive N samples taken from the single analog waveform, a second sample-and-hold based processing module that can be configured to receive the N samples in parallel, and generate a second analog waveform from each of the N samples using a second set of N respective sample-and-hold blocks to generate a second set of N analog waveforms. The transmitter can further include a second modulation module that can be configured to modulate the second set of N analog waveforms with a second set of N product modulators based on a second set of N respective sinusoidal waves of different frequencies to generate a second set of N modulated waveforms. The transmitter can further include a second adder module configured to sum the second set of N modulated waveforms in a second adder to obtain a final analog waveform to be transmitted to a receiver. The overall effect is same as transmitting the block of bits as an ideal discrete time sequence through an ideal Discrete-time to Continuous-time converter. Each sample of discrete time sequence is separated by time duration equal to inverse of fundamental frequency of the N modulated waveforms. Ideal discrete time sequences are impulses and ideal Discrete-time to continuous-time converter need ideal sinc functions that extend from minus infinity to plus infinity, both being impractical to design. The proposed method is aimed at achieving the effect equivalent to ideal implementation as mentioned before. Also, depending on the nature of blocks, one complete set of first set of modules may be unnecessary, for example, if the input blocks are provided directly as the outcome of Sampling module.

In an aspect, receiver of the present disclosure can include a first integration module that can be configured to process the final analog waveform with respect to N integrator blocks to generate the N samples, each integrator block being specific for a sinusoid of a particular frequency. The receiver can further include a first parallel-to-serial converter module that can be configured to process the N samples to generate a discrete-time signal having the N samples, and a first Digital-to-Analog Converter module that can be configured to process the discrete-time signal to generate the single analog waveform. The receiver can further include a second integration module that can be configured to process the single analog waveform with a second set of N integrator blocks to generate the N symbols, wherein each integrator block of the second set of N integrator blocks being specific for a sinusoid of a particular frequency, and a second parallel-to-serial converter module that can be configured to process the N symbols to generate a second discrete-time signal having the N symbols. Depending on the quality of the final analog waveform, an ideal sampler would, without the need of complete set of first and second set of modules, give the required information. If error can be tolerated or error does not misrepresent the transmitted information, non-ideal sampler would also give the required information.

In an aspect, sinusoidal waves can include any or a combination of Sine waves or Cosine waves. In another aspect, the different frequencies can include multiplication of frequency w up to N*w, say w, 2 w, 3 w, . . . , Nw. In yet another aspect, the transmitter can further include an amplification module that can be configured to amplify the final analog waveform before being sent to the receiver. In yet another aspect, each symbol can include any or a combination of a real part and an imaginary part, wherein each of the real part and the imaginary part can be separated and processed independently, and wherein in case the real part is processed, sinusoidal waves are Cosine waves, and in case the imaginary part is processed, sinusoidal waves are Sine waves.

In an aspect, the final analog waveform of the real part and final analog waveform of the imaginary part can be added to obtain RF wave to be transmitted. In yet another aspect, the set of symbols can be generated from information that is to be transmitted by the transmitter to the receiver, and wherein the set of symbols can be generated based on action of any or a combination of QPSK, BPSK, 8-PSK, and 64-QAM, on the information to be transmitted, and including OFDM sample from a set of OFDM samples. In another aspect, the transmitter can further include a sampling module that can be configured to retrieve the N samples from the single analog waveform, and transmit the N samples to the second serial-to-parallel converter module.

In an aspect, the receiver can include a filter module that can be configured to receive the final analog waveform and process the final analog waveform to remove effect of channel and receiver noise. In another aspect, the transmitter can be operatively coupled with the receiver through a communication channel. In yet another aspect, the transmitter and the receiver can be configurable in any or a combination of Inverse Discrete Fourier Transform (IDFT), Discrete Fourier Transform (DFT), Fast Fourier Transform (FFT), Inverse Fast Fourier Transform (IFFT), Digital-to-Analog Converters (DAC), Analog-to-Digital Converters (ADC), and Band-pass Notch filter.

In an aspect, the present disclosure further relates to a method for transmitting information from a transmitter to a receiver along a channel, wherein the method can include the step of generating, at a transmitter, a plurality of blocks, each block comprising N symbols from a set of symbols received from a client layer. The method can further include the steps of transmitting for each block, each of the N symbols in parallel, and the step of generating an analog waveform from each of the N symbols of the respective block using N respective sample-and-hold blocks to generate N analog waveforms. The method can further include the steps of modulating the N analog waveforms with respective N product modulators based on N respective sinusoidal waves of different frequencies to generate N modulated waveforms, and summing, at the transmitter, the N modulated waveforms in a first adder to obtain a single analog waveform. The method can further include the steps of receiving, at the transmitter, N samples taken from the single analog waveform, and receiving, at the transmitter, the N samples in parallel, and generating a second analog waveform from each of the N samples using a second set of N respective sample-and-hold blocks to generate a second set of N analog waveforms. Further, the method can include modulating, at the transmitter, the second set of N analog waveforms with respective a second set of N product modulators based on a second set of N respective sinusoidal waves of different frequencies to generate a second set of N modulated waveforms; and summing, at the transmitter, the second set of N modulated waveforms in a second adder to obtain a final analog waveform to be transmitted to a receiver.

In an aspect, method of the present disclosure, at the receiver end, can include the step of processing, at the receiver, the final analog waveform with respect to N integrator blocks to generate the N samples, each integrator block being specific for a sinusoid of a particular frequency, and processing, at the receiver, the N samples to generate a discrete-time signal having the N samples. The method can further include the steps of processing, at the receiver, the discrete-time signal to generate the single analog waveform, and processing, at the receiver, the single analog waveform with a second set of N integrator blocks to generate the N symbols, wherein each integrator block of the second set of N integrator blocks being specific for a sinusoid of a particular frequency. The method can further include the step of processing, at the receiver, the N symbols to generate a second discrete-time signal having the N symbols.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIGS. 3A and 3B illustrate exemplary block diagrams showing the processing at receiver end in accordance with an embodiment of the present disclosure.

DETAILED DESCRIPTION

Figure 1A:
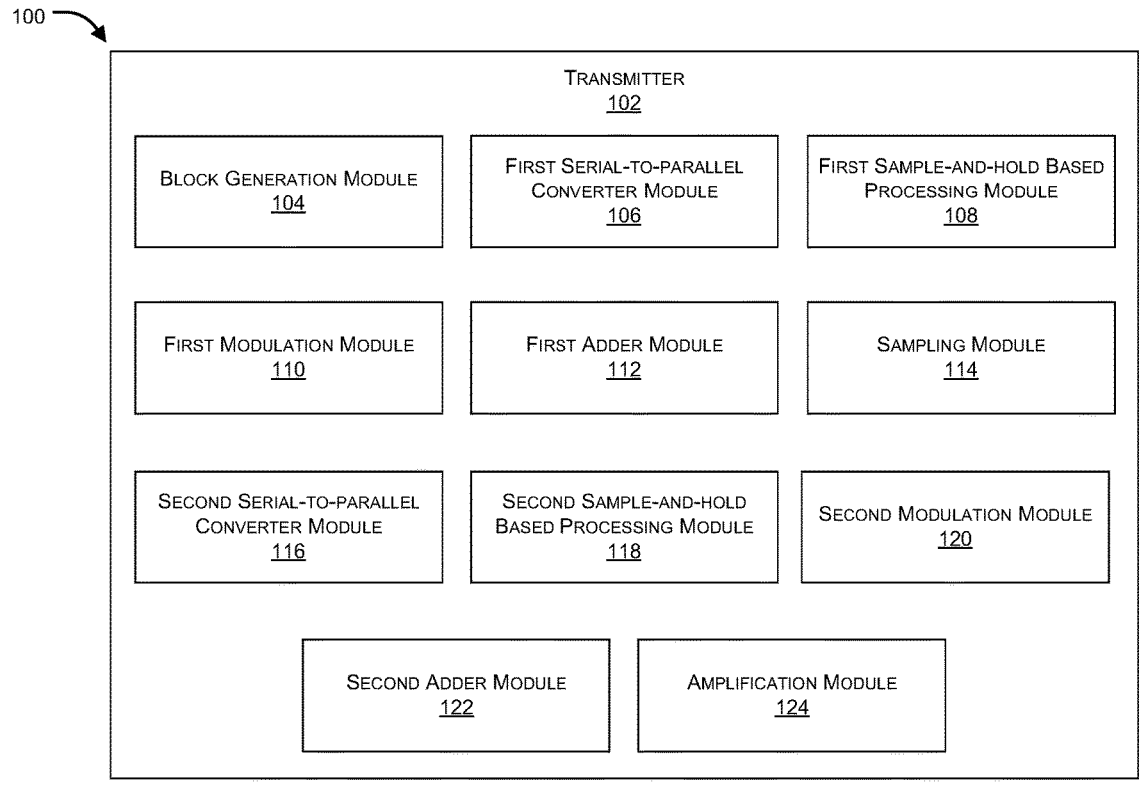
FIG. 1A illustrates an exemplary module diagram of transmitter side sub-system of communication system for achieving zero PAPR value in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims define a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure generally relates to a wireless communication system that provides lower peak to average power ratio (PAPR). In particular, the present disclosure pertains to communication systems and methods for achieving low peak to average power ratio (PAPR) for transmitted symbols of wireless devices.

The present disclosure generally relates to a communication system that provides lower peak to average power ratio (PAPR). In particular, the present disclosure pertains to communication systems and methods for achieving low peak to average power ratio (PAPR) for transmitted symbols of computing devices.

In an aspect, communication system of the present disclosure can include a transmitter that can include a block generation module that can be configured to generate a plurality of blocks, each block comprising N symbols from a set of symbols received from a client layer. The transmitter can further include a first serial-to-parallel converter module that can be configured to transmit, for each block, each of the N symbols in parallel, and a first sample-and-hold based processing module that can be configured to receive the N symbols in parallel and generate an analog waveform from each of the N symbols of the respective block using N respective sample-and-hold blocks to generate N analog waveforms. The transmitter can further include a first modulation module that can be configured to modulate the N analog waveforms with respective N product modulators based on N respective sinusoidal waves of different frequencies to generate N modulated waveforms, and a first adder module that can be configured to sum the N modulated waveforms in a first adder to obtain a single analog waveform. The transmitter can further include a second serial-to-parallel converter module that can be configured to receive N samples taken from the single analog waveform, a second sample-and-hold based processing module that can be configured to receive the N samples in parallel and generate a second analog waveform from each of the N samples using a second set of N respective sample-and-hold blocks to generate a second set of N analog waveforms. The transmitter can further include a second modulation module that can be configured to modulate the second set of N analog waveforms with a second set of N product modulators based on a second set of N respective sinusoidal waves of different frequencies to generate a second set of N modulated waveforms. The transmitter can further include a second adder module configured to sum the second set of N modulated waveforms in a second adder to obtain a final analog waveform to be transmitted to a receiver.

In an aspect, receiver of the present disclosure can include a first integration module that can be configured to process the final analog waveform with respect to N integrator blocks to generate the N samples, each integrator block being specific for a sinusoid of a particular frequency. The receiver can further include a first parallel-to-serial converter module that can be configured to process the N samples to generate a discrete-time signal having the N samples, and a first Digital-to-Analog Converter module that can be configured to process the discrete-time signal to generate the single analog waveform. The receiver can further include a second integration module that can be configured to process the single analog waveform with a second set of N integrator blocks to generate the N symbols, wherein each integrator block of the second set of N integrator blocks being specific for a sinusoid of a particular frequency, and a second parallel-to-serial converter module that can be configured to process the N symbols to generate a second discrete-time signal having the N symbols.

In an aspect, sinusoidal waves can include any or a combination of Sine waves or Cosine waves. In another aspect, the different frequencies can include multiplication of frequency w up to N*w, say w, 2 w, 3 w, . . . , Nw. In yet another aspect, the transmitter can further include an amplification module that can be configured to amplify the final analog waveform before being sent to the receiver. In yet another aspect, each symbol can include any or a combination of a real part and an imaginary part, wherein each of the real part and the imaginary part can be separated and processed independently, and wherein in case the real part is processed, sinusoidal waves are Cosine waves, and in case the imaginary part is processed, sinusoidal waves are Sine waves.

In an aspect, the final analog waveform of the real part and final analog waveform of the imaginary part can be added to obtain RF wave to be transmitted. In yet another aspect, the set of symbols can be generated from information that is to be transmitted by the transmitter to the receiver, and wherein the set of symbols can be generated based on action of any or a combination of QPSK, BPSK, 8-PSK, and 64-QAM, on the information to be transmitted, and including OFDM sample from a set of OFDM samples. In another aspect, the transmitter can further include a sampling module that can be configured to retrieve the N samples from the single analog waveform, and transmit the N samples to the second serial-to-parallel converter module.

In an aspect, the receiver can include a filter module that can be configured to receive the final analog waveform and process the final analog waveform to remove effect of channel and receiver noise. In another aspect, the transmitter can be operatively coupled with the receiver through a communication channel. In yet another aspect, the transmitter and the receiver can be configurable in any or a combination of Inverse Discrete Fourier Transform (IDFT), Discrete Fourier Transform (DFT), Fast Fourier Transform (FFT), Inverse Fast Fourier Transform (IFFT), Digital-to-Analog Converters (DAC), Analog-to-Digital Converters (ADC), and Band-pass Notch filter.

It may be appreciated that all the modules of the transmitter viz. the "block generation module", "first serial-to-parallel converter module", and "first sample-and-hold based processing module", "first modulation module", "first adder module", "second serial-to-parallel converter module", "second sample-and-hold based processing module", "second modulation module", "second adder module", "amplification module" and "sampling module" may be implemented by a plurality of circuits comprised in the transmitter. It may further appreciated that all the modules of the receiver viz. the "first integration module", "first parallel-to-serial converter module", "first digital-to-analog converter module", "second integration module", "second parallel-to-serial converter module", and "filter module" may also be implemented by a plurality of circuits comprised in the receiver.

In an aspect, the present disclosure further relates to a method for transmitting information from a transmitter to a receiver along a channel, wherein the method can include the step of generating, at a transmitter, a plurality of blocks, each block comprising N symbols from a set of symbols received from a client layer. The method can further include the steps of transmitting for each block, each of the N symbols in parallel, and the step of generating an analog waveform from each of the N symbols of the respective block using N respective sample-and-hold blocks to generate N analog waveforms. The method can further include the steps of modulating the N analog waveforms with respective N product modulators based on N respective sinusoidal waves of different frequencies to generate N modulated waveforms, and summing, at the transmitter, the N modulated waveforms in a first adder to obtain a single analog waveform. The method can further include the steps of receiving, at the transmitter, N samples taken from the single analog waveform, and receiving, at the transmitter, the N samples in parallel, and generating a second analog waveform from each of the N samples using a second set of N respective sample-and-hold blocks to generate a second set of N analog waveforms. Further, the method can include modulating, at the transmitter, the second set of N analog waveforms with respective a second set of N product modulators based on a second set of N respective sinusoidal waves of different frequencies to generate a second set of N modulated waveforms; and summing, at the transmitter, the second set of N modulated waveforms in a second adder to obtain a final analog waveform to be transmitted to a receiver.

In an aspect, method of the present disclosure, at the receiver end, can include the step of processing, at the receiver, the final analog waveform with respect to N integrator blocks to generate the N samples, each integrator block being specific for a sinusoid of a particular frequency, and processing, at the receiver, the N samples to generate a discrete-time signal having the N samples. The method can further include the steps of processing, at the receiver, the discrete-time signal to generate the single analog waveform, and processing, at the receiver, the single analog waveform with a second set of N integrator blocks to generate the N symbols, wherein each integrator block of the second set of N integrator blocks being specific for a sinusoid of a particular frequency. The method can further include the step of processing, at the receiver, the N symbols to generate a second discrete-time signal having the N symbols.

In an aspect, an object of the present disclosure is to transmit information across a communication channel efficiently and without error. To enable transmission of information across a communication channel such that the Peak to Average Power Ratio (PAPR) is one (zero in decibels), while ensuring that the information transmitted is present only along a finite number of orthogonal frequencies. In an aspect, the present disclosure combines advantages of both Single-carrier Transmission (SCT) and Multi-Carrier Transmission (MCT) systems (e.g. Orthogonal Frequency Division Multiplexing (OFDM) systems)

FIG. 1A illustrates an exemplary module diagram 100 of transmitter side sub-system of communication system for achieving zero PAPR value in accordance with an embodiment of the present disclosure. In an aspect, transmitter 102 of the present disclosure can include a block generation module 104 that can be configured to generate a plurality of blocks, each block comprising N symbols from a set of symbols received from a client layer. In an aspect, information to be transmitted by the transmitter of the present disclosure can be converted into symbols obtained from standard constellation(s) such as QPSK, BPSK, 8-PSK, 64-QAM, among others, after source encoding has been done, and including OFDM sample from a set of samples. Selection of the constellation can determine the transmitted PAPR, and therefore an appropriate constellation, for instance, can be chosen for a given PAPR limit. QPSK, BPSK and 8-PSK have PAPR of 1 (or zero Decibels.). Each symbol can include a real, and possibly an imaginary part (BPSK has only real part), wherein the real and imaginary parts of each symbol can be separated and both can be processed independently. In an instance, for the purpose of explanation, we can represent the sequence of N real parts as $b[n]$ (for $n=0, 1, \ldots, N-1$).

Transmitter 102 of the present disclosure can further include a first serial-to-parallel converter module 106 that can be configured to transmit, for each block, each of the N symbols in parallel. In an aspect, serial to parallel converter of the present disclosure can produce symbols $b[n]$ (for $n=0, 1, \ldots, N-1$) by splitting the input signal into blocks containing N symbols each, which can be done for both the real and imaginary parts separately.

Transmitter 102 of the present disclosure can further include a first sample-and-hold based processing module 108 that can be configured to receive the N symbols in parallel, and generate an analog waveform from each of the N symbols of the respective block using N respective sample-and-hold blocks to generate N analog waveforms. In an exemplary implementation, each of the N symbols can be sent to N Sample-and-Hold blocks, wherein the sample and hold blocks can generate analog signals of amplitude $b[n]$, and these signals can then be sent to N multiplier blocks.

In an aspect, transmitter 102 can further include a first modulation module 110 that can be configured to modulate the N analog waveforms with respective N product modulators based on N respective sinusoidal waves of different frequencies to generate N modulated waveforms. In an exemplary implementation, each of the N multiplier blocks can also be fed with Sinusoidal waves (Cosine waves can be fed to the block processing real values, and Sine waves are fed to the block processing the imaginary values, for instance) of frequency ranging from $w, 2w, 3w, \ldots, Nw$, wherein $w=2*pi*f$, f is frequency of the wave. The result of the N multiplier blocks can be sent to the adder block.

Transmitter 102 of the present disclosure can further include a first adder module 112 that can be configured to sum the N modulated waveforms in a first adder to obtain a single analog waveform. In an aspect, the adder block can generate an analog waveform by combining the outputs of the N multiplier blocks, wherein the N samples can be taken from this analog waveform, and these N samples can be sent to the second Serial-to-Parallel converter.

In an aspect, transmitter 102 can further include a sampling module 114 that can be configured to retrieve the N samples from the single analog waveform, and transmit the N samples to the second serial-to-parallel converter module. Transmitter 102 of the present disclosure can further include the second serial-to-parallel converter module 116 that can be configured to receive N samples taken from the single analog waveform. In an implementation, the N samples taken from the analog waveform can be represented by B[n] (for n=0, 1, ..., N−1), wherein these N symbols can be sent to N Sample-and-Hold blocks.

In an aspect, transmitter 102 can further include a second sample-and-hold based processing module 118 that can be configured to receive the N samples in parallel, and generate a second analog waveform from each of the N samples using a second set of N respective sample-and-hold blocks to generate a second set of N analog waveforms. The sample and hold blocks can generate analog signals of amplitude B[n], and these signals are sent to the N multiplier blocks.

Transmitter 102 can further include a second modulation module 120 that can be configured to modulate the second set of N analog waveforms with respective a second set of N product modulators based on a second set of N respective sinusoidal waves of different frequencies to generate a second set of N modulated waveforms. In an aspect, each of the N multiplier blocks can also be fed with Sinusoidal waves (Cosine waves can be fed to the block processing real values, and Sine waves can be fed to the block processing the imaginary values, for instance) of frequency ranging from w, 2 w, 3 w, ..., Nw, wherein the result of the N multiplier blocks can be sent to the adder block.

Transmitter 102 can further include a second adder module 122 that can be configured to sum the second set of N modulated waveforms to obtain a final analog waveform to be transmitted to a receiver. In an aspect, the adder block can generate an analog waveform by combining the outputs of the N multiplier blocks. In another aspect, the block processing the real part can generate an analog waveform, and block processing the imaginary part can also generate another analog waveform, wherein the two waveforms can be added up to obtain the RF wave to be transmitted.

In another exemplary aspect, transmitter 102 can further include an amplification module 124 that can be configured to amplify the final analog waveform before being sent to the receiver.

Figure 1B:
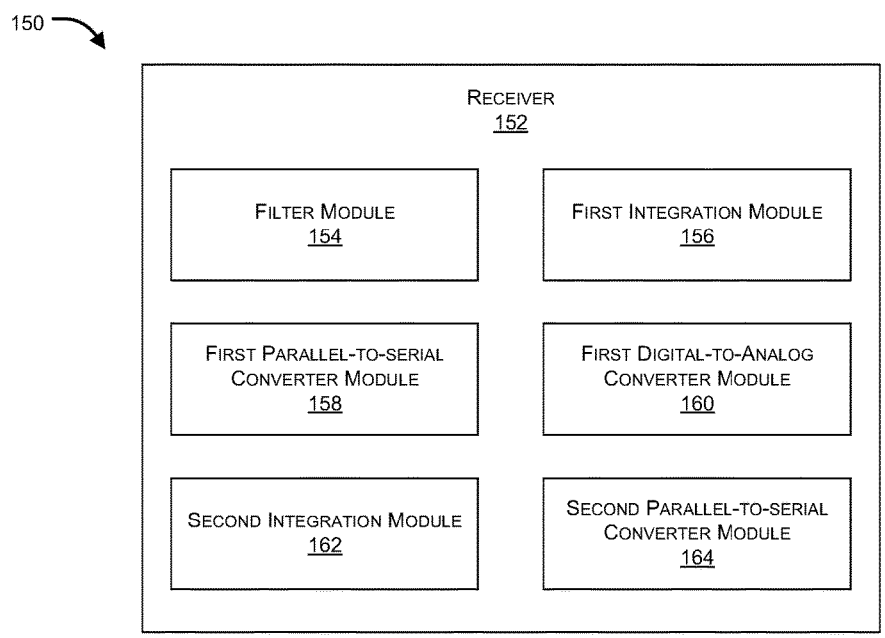
FIG. 1B illustrates an exemplary module diagram of a receiver side sub-system of communication system for achieving zero PAPR in accordance with an embodiment of the present disclosure.

FIG. 1B illustrates an exemplary module diagram 150 of a receiver side sub-system of communication system for achieving zero (in dB) PAPR in accordance with an embodiment of the present disclosure. In an aspect, receiver 152 can optionally include a filter module 154 that can be configured to receive the final analog waveform and process the final analog waveform to remove effect of channel and receiver noise. In an aspect, module 154 can further be configured to process the waveform obtained at the receiver 152 to remove the effect of channel and receiver noise using a filter, and pass band to baseband converter, wherein the waveform can also be amplified, if required.

Receiver 152 can further include a first integration module 156 that can be configured to process the final analog waveform with respect to N integrator blocks to generate the N samples, each integrator block being specific for a sinusoid of a particular frequency. The receiver 152 can further include a first parallel-to-serial converter module 158 that can be configured to process the N samples to generate a discrete-time signal having the N samples.

In an aspect, the receiver 152 can further include a first Digital-to-Analog Converter (DAC) module 160 that can be configured to process the discrete-time signal to generate the single analog waveform using a DAC converter. The receiver 152 can further include a second integration module 162 that can be configured to process the single analog waveform with a second set of N integrator blocks to generate the N symbols, wherein each integrator block of the second set of N integrator blocks being specific for a sinusoid of a particular frequency. Receiver 152 can further include a second parallel-to-serial converter module 164 that can be configured to process the N symbols to generate a second discrete-time signal having the N symbols.

In an aspect, sample interval used for the present disclosure can be determined by the bit or symbol duration or by the fundamental frequency used for modulation. In another aspect, the present/proposed structure/construction/operation creates a band-pass notch filter that filters only the frequency content ranging from w, 2 w, 3 w, ..., Nw from the digital transmission pulse without having the disadvantage of high PAPR of OFDM or OFDMA systems. The present disclosure also enables transmission of information using a finite number of orthogonal frequencies, while maintaining PAPR equal to one (zero in decibels). The present architecture further reduces the Peak to Average Power Ratio (PAPR) to the lowest possible value of one during transmission in communication systems. The proposed solution also reduces power consumption in equipment transmitting information (for instance, in radio-frequency antennae), wherein the desired information can be transmitted over larger distances using the same apparatus, reducing the cost of deploying networks.

In yet another aspect, the set of symbols can be generated from information that is to be transmitted by the transmitter to the receiver, and wherein the set of symbols are generated based on action of any or a combination of QPSK, BPSK, 8-PSK, and 64-QAM, on the information to be transmitted, and including OFDM sample from a set of samples. In another aspect, the transmitter 102 can be operatively coupled with the receiver 152 through a communication channel. In yet another aspect, the transmitter 102 and the receiver 152 can be configurable in any or a combination of Inverse Discrete Fourier Transform (IDFT), Discrete Fourier Transform (DFT), Fast Fourier Transform (FFT), Inverse Fast Fourier Transform (IFFT), Digital-to-Analog Converters (DAC), Analog-to-Digital Converters (ADC), and Bandpass Notch filter.

Figure 2A:
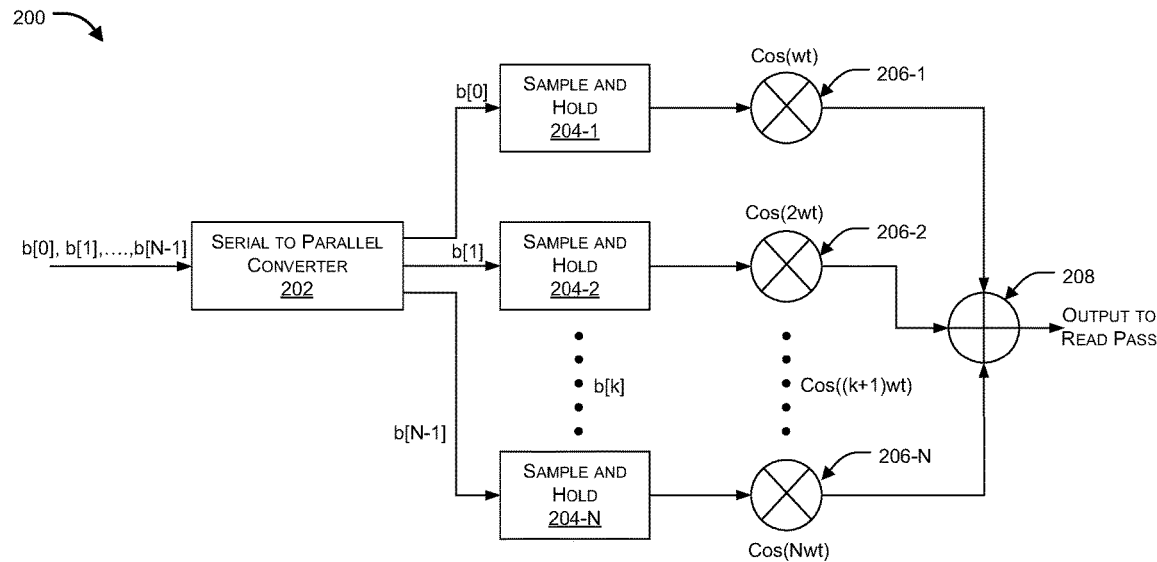
FIGS. 2A and 2B illustrate exemplary block diagrams showing the processing at transmitter end in accordance with an embodiment of the present disclosure.
Figure 2B:
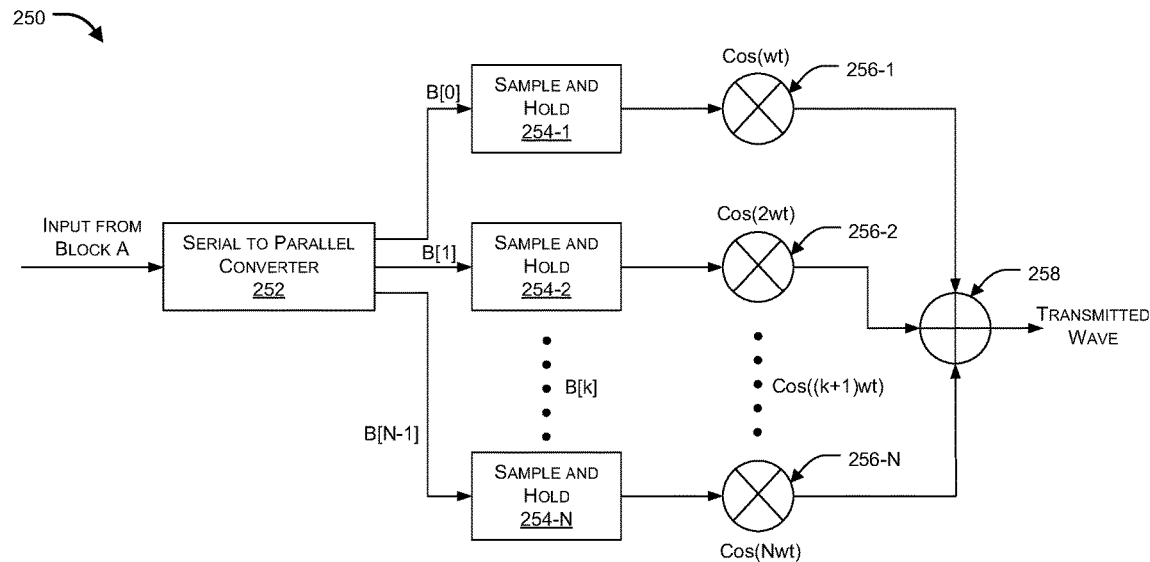

FIGS. 2A and 2B illustrate exemplary block diagrams 200 and 250 showing the processing at transmitter end in accordance with an embodiment of the present disclosure. The transmitter of the present invention can process the information to be transmitted in two passes, wherein the first pass (shown in 200) involves obtaining, from an infinite number of sub-carriers, only orthogonal sub-carriers, and the second pass (shown in 250) involves obtaining the orthogonal sub-carriers in the same constellation as that of the input stream/pulse. Therefore, in an aspect, in the present invention, input and output constellation will be same (for instance, the constellation can be 8-PSK), wherein the frequency content (infinite) of the input pulse or bit stream and the output frequency content (orthogonal and finite, i.e. N) varies.

In the first pass 200, the transmitter can generate a plurality of blocks, each block comprising N symbols from a set of symbols received from a client layer. In an aspect, information to be transmitted by the transmitter of the present disclosure can be converted into symbols obtained from standard constellation(s) such as QPSK, BPSK, 8-PSK, 64-QAM, among others, after source encoding has been done, and including OFDM sample from a set of OFDM samples. Selection of the constellation can determine the transmitted PAPR, and therefore an appropriate constellation, for instance, can be chosen for a given PAPR limit. QPSK, BPSK and 8-PSK have PAPR of 1 (or zero Decibels.). Each symbol can include a real, and possibly an imaginary part (BPSK has only real part), wherein the real and imaginary parts of each symbol can be separated and both can be processed independently. In an instance, for the purpose of explanation, we can represent the sequence of N real parts as b[n] (for n=0, 1, ..., N−1).

The transmitter include a first serial-to-parallel converter 202 that can be configured to transmit, for each block, each of the N symbols in parallel. In an aspect, serial to parallel converter 202 of the present disclosure can produce symbols b[n] (for n=0, 1, ..., N−1) by splitting the input signal into blocks containing N symbols each, which can be done for both the real and imaginary parts separately.

In an aspect, transmitter of the present disclosure can further be configured to receive the N symbols in parallel, and generate an analog waveform from each of the N symbols of the respective block using N respective sample-and-hold blocks 204-1, 204-2, ..., 204-N to generate N analog waveforms. In an exemplary implementation, each of the N symbols can be sent to N Sample-and-Hold blocks 204, wherein the sample and hold blocks 204 can generate analog signals of amplitude b[n], and these signals can then be sent to N multiplier blocks 206.

In an aspect, transmitter can be configured to modulate the N analog waveforms with respective N product modulators 206-1, 206-2, ..., 206-N, based on N respective sinusoidal waves of different frequencies to generate N modulated waveforms. In an exemplary implementation, each of the N multiplier blocks 206 can also be fed with Sinusoidal waves (Cosine waves can be fed to the block processing real values, and Sine waves are fed to the block processing the imaginary values, for instance) of frequency ranging from w, 2 w, 3 w, ..., Nw, wherein w=2*pi*f, f is frequency of the wave or fundamental frequency or harmonic. The result of the N multiplier blocks 206 can be sent to the adder block 208.

Transmitter of the present disclosure can further include a first adder 208 that can be configured to sum the N modulated waveforms to obtain a single analog waveform. In an aspect, the adder block 208 can generate an analog waveform by combining the outputs of the N multiplier blocks, wherein the N samples can be taken from this analog waveform, and these N samples can be sent to the second Serial-to-Parallel converter 252 of the second pass.

In the second pass, the transmitter can include the second serial-to-parallel converter 252 that can be configured to receive N samples taken from the single analog waveform. In an implementation, the N samples taken from the analog waveform can be represented by B[n] (for n=0, 1, ..., N−1), wherein these N symbols can be sent to N Sample-and-Hold blocks 254. Instead of block 252 and 254 we could have N repeater to repeat the output of 208 and N sample and hold with delay equal to sample duration. This will avoid use of ideal sampler.

In an aspect, the N Sample-and-Hold blocks 254 (254-1, 254-2, ..., 254-N) can be configured to receive the N samples in parallel, and generate a second analog waveform from each of the N samples using a second set of N respective sample-and-hold blocks 254 to generate a second set of N analog waveforms. The sample and hold blocks 254 can generate analog signals of amplitude B[n], and these signals are sent to the N multiplier blocks.

Transmitter 102 of the present disclosure can further be configured to modulate the second set of N analog waveforms with respective a second set of N product modulators 256 (256-1, 256-2, ..., 256-N) based on a second set of N respective sinusoidal waves of different frequencies to generate a second set of N modulated waveforms. In an aspect, each of the N multiplier blocks 256 can also be fed with Sinusoidal waves (Cosine waves can be fed to the block processing real values, and Sine waves can be fed to the block processing the imaginary values, for instance) of frequency ranging from w, 2 w, 3 w, ..., Nw, wherein the result of the N multiplier blocks 256 can be sent to the adder block 258.

In an aspect, the adder 258 can be configured to sum the second set of N modulated waveforms to obtain a final analog waveform to be transmitted to a receiver. In an aspect, the adder block 258 can generate an analog waveform by combining the outputs of the N multiplier blocks 258. In another aspect, the block processing the real part can generate an analog waveform, and block processing the imaginary part can also generate another analog waveform, wherein the two waveforms can be added up to obtain the RF wave to be transmitted.

FIGS. 3A and 3B illustrate exemplary block diagrams 300 and 350 showing the processing at receiver end in accordance with an embodiment of the present disclosure. Similar to the transmitter, receiver process too can be configured in two passes, wherein, in the first pass 300, the receiver can include an error/noise correction block 302 to process received final analog waveform to remove effect of channel and receiver noise. In an implementation, error/noise correction block 302 can further be configured to process the waveform obtained at the receiver to remove the effect of channel and receiver noise using a filter, and passband to baseband converter, wherein the waveform can also be amplified, if required.

Receiver of the present disclosure can further include N integrator blocks 304-1, 304-2, ..., 304-N (collectively referred to as 304 hereinafter), wherein the N integrator blocks 304 can be configured to process the final analog waveform to generate the N samples, each integrator block 304 being specific for a sinusoid of a particular frequency. Receiver can further include a first parallel-to-serial converter 306 that can be configured to process the N samples to generate a discrete-time signal having the N samples. In an aspect, the receiver can further include a Digital-to-Analog Converter (DAC) 308 that can be configured to process the discrete-time signal to generate the single analog waveform, which can be sent to the second pass 350 through block 310.

In the second pass 350, the receiver can receive the single analog waveform at block 352, and can include a second set of N integrator blocks 354-1, 354-2, ..., 354-N (collectively referred to as 354 hereinafter), wherein the second set of N integrator blocks 354 can be configured to process the single analog waveform to generate the N symbols, wherein each integrator block of the second set of N integrator blocks 354 being specific for a sinusoid of a particular frequency. Receiver can further include a second parallel-to-serial converter 356 that can be configured to process the N symbols to generate a second discrete-time signal having the N symbols. This discrete-time signal having N samples represents one block of information that was transmitted.

Figure 4:
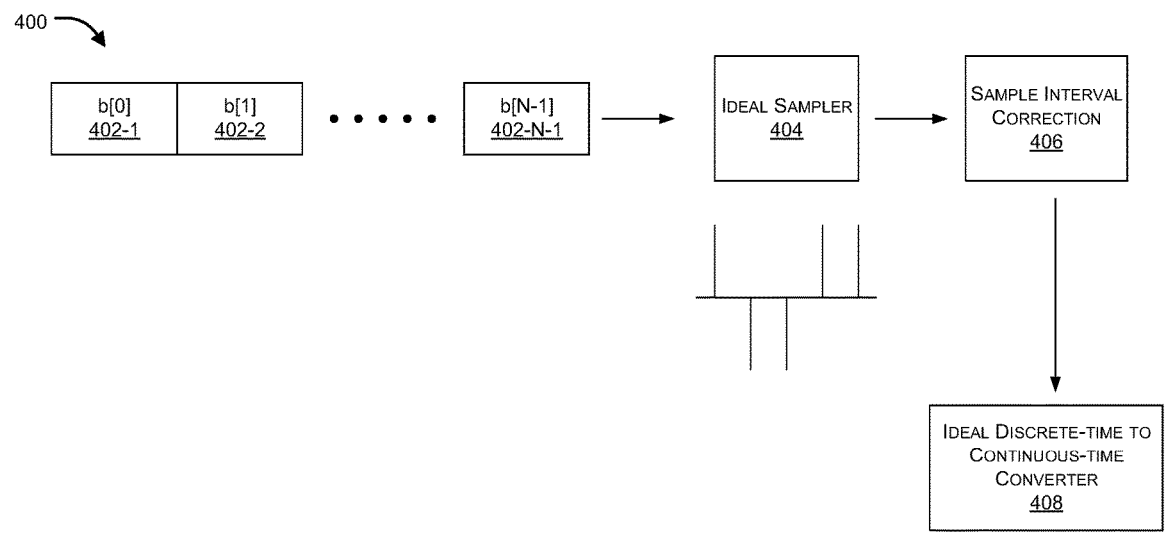
FIG. 4 illustrates another exemplary architecture 400 of an ideal transmitter in accordance with an embodiment of the present disclosure.

FIG. 4 illustrates another exemplary architecture 400 of an ideal transmitter in accordance with an embodiment of the present disclosure. As seen, the above-mentioned and inventive transmitter architecture aims at realizing this ideal transmitter architecture 400 by transmitting a block/stream of bits/pulses 402 b[0], b[1], ... b[N−1] as an ideal discrete time sequence through an ideal Discrete-time to Continuous-time converter (ideal DTCT converter) 408, wherein each sample of discrete time sequence can be separated by time duration equal to inverse of fundamental frequency of the N modulated waveforms. In an aspect, the stream of pulses can be processed by an ideal sampler 404 that can generate ideal samples with sample interval equal to inverse of fundamental frequency. The ideal samples can then further undergo sample interval correction, for instance at block 406, wherein the sample interval correction block 404 can ensure that separation between each sample is equal to inverse of fundamental frequency of OFDM. The Ideal DTCT converter 406, on the other hand, as mentioned above, can then use sinc interpolation to get a continuous wave, wherein ideal discrete time sequences are impulses, and Ideal DTCT converter 406 needs ideal sinc (cardinal sine) functions that extend from minus infinity to plus infinity, both being impractical to design. The proposed method is aimed at achieving the effect equivalent to ideal implementation as mentioned before. Also, depending on the nature of blocks, one complete set of first set of modules may be unnecessary, for example, if the input blocks are provided directly as the outcome of Sampling module.

Figure 5:
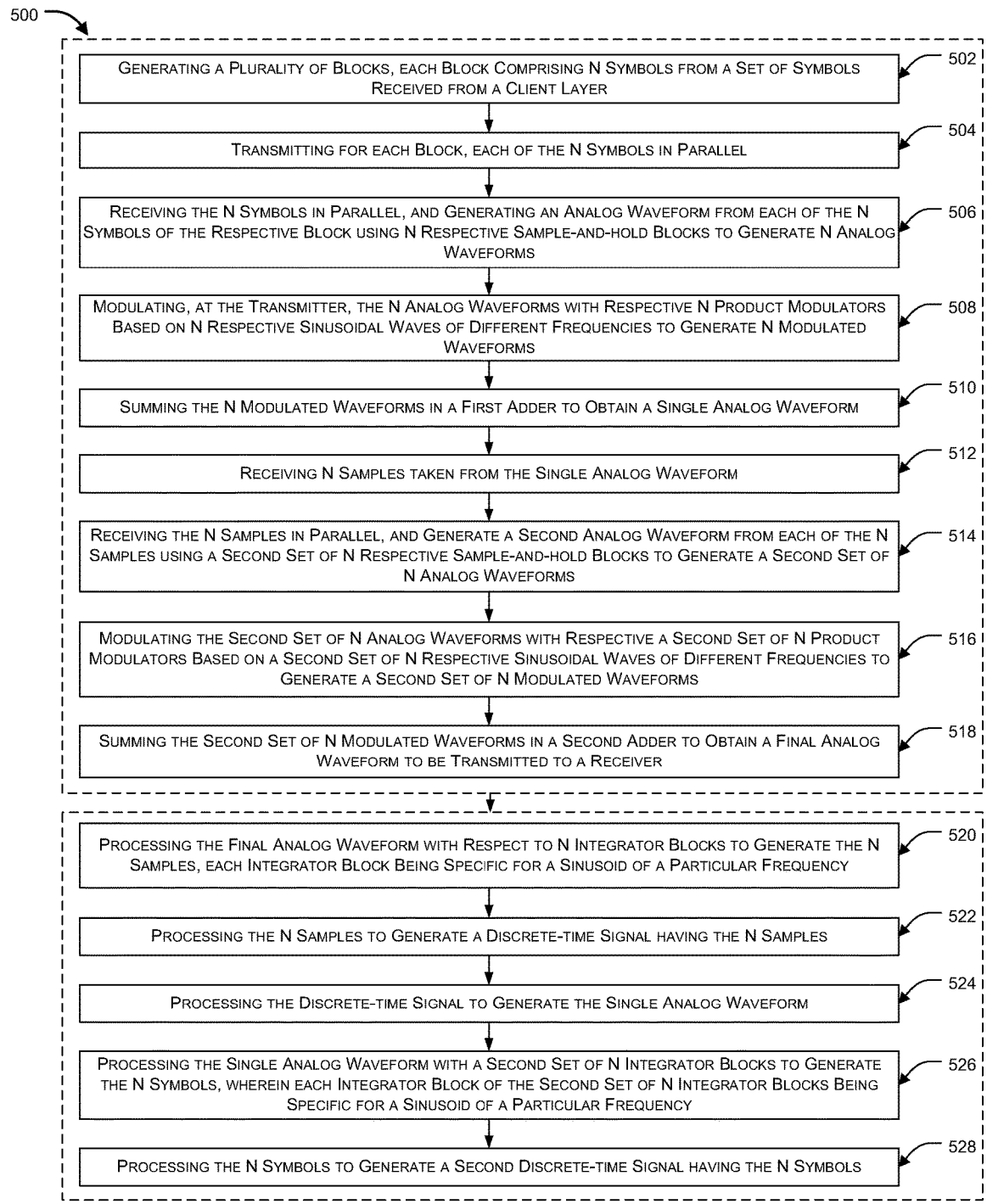
FIG. 5 illustrates an exemplary flow diagram illustrating an implementation of the proposed communication system in accordance with an embodiment of the present disclosure.

FIG. 5 illustrates an exemplary flow diagram 500/550 illustrating an implementation of the proposed communication system in accordance with an embodiment of the present disclosure. Method of the present disclosure can be divided into steps performed at the transmitter (as shown in 500), and steps performed at the receiver (as shown in 550). In an aspect, steps performed at the transmitter can include, at step 502, generating a plurality of blocks, each block comprising N symbols from a set of symbols received from a client layer. At step 504, the method can include transmitting for each block, each of the N symbols in parallel, and at step 506, the method can include receiving the N symbols in parallel, and generating an analog waveform from each of the N symbols of the respective block using N respective sample-and-hold blocks to generate N analog waveforms. At step 508, the method can include modulating the N analog waveforms with respective N product modulators based on N respective sinusoidal waves of different frequencies to generate N modulated waveforms, and at step 510, the method can include summing the N modulated waveforms in a first adder to obtain a single analog waveform.

At step 512, the method can include receiving, at the transmitter, N samples taken from the single analog waveform, and at step 514, the method can include receiving the N samples in parallel, and generating a second analog waveform from each of the N samples using a second set of N respective sample-and-hold blocks to generate a second set of N analog waveforms. At step 516, the method can include the step of modulating the second set of N analog waveforms with a second set of N product modulators based on a second set of N respective sinusoidal waves of different frequencies to generate a second set of N modulated waveforms. At step 418, the method can include the step of summing the second set of N modulated waveforms in a second adder to obtain a final analog waveform to be transmitted to a receiver.

In an aspect, at the receiver end, the method of the present disclosure can include, at step 552, processing, at the receiver, the final analog waveform with respect to N integrator blocks to generate the N samples, each integrator block being specific for a sinusoid of a particular frequency, and at step 554, processing, at the receiver, the N samples to generate a discrete-time signal having the N samples. The method can further include, at step 556, processing the discrete-time signal to generate the single analog waveform, and at step 558, processing the single analog waveform with a second set of N integrator blocks to generate the N symbols, wherein each integrator block of the second set of N integrator blocks being specific for a sinusoid of a particular frequency. At step 560, the method can include the step of processing, at the receiver, the N symbols to generate a second discrete-time signal having the N symbols.

Figure 6:
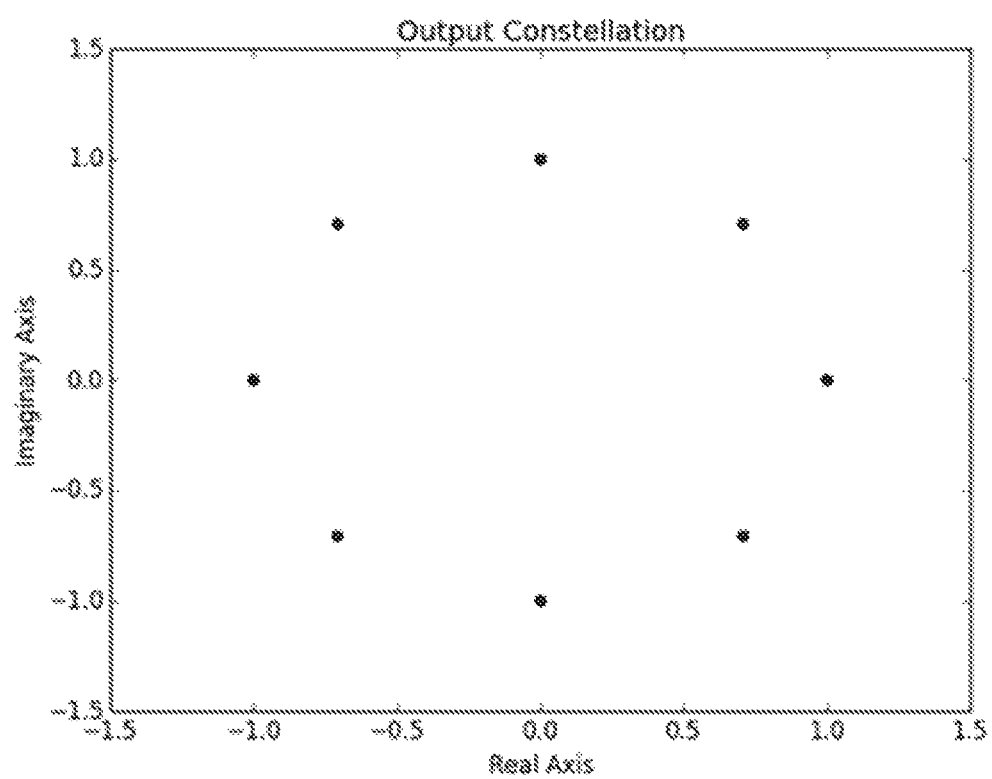
FIG. 6 illustrates an exemplary output constellation using the proposed method of the present disclosure.

FIG. 6 illustrates an exemplary output constellation 600 using the proposed method of the present disclosure. As can be seen, all points on the output when plotted in the X-Y plane can be formed on the same circle, and therefore the distance from the origin is the same for all the points and they are hence transmitted with the same power, making the PAPR of unity (lowest possible value). The proposed method therefore has the advantage of Single Carrier Transmission (SCR) systems, wherein multiple frequencies can be used to send many data bits in a single time period as in MCT systems. Also, the subcarrier frequencies are orthogonal to each other as in Orthogonal Frequency Division Multiplexing (OFDM) Systems, leading to reduced Inter-Symbol Interference (ISI).

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure enables transmission of information across a communication channel efficiently and without error.

The present disclosure enables transmission of information across a communication channel such that the Peak to Average Power Ratio (PAPR) is one (zero in decibels).

The present disclosure enables transmission of information across a communication channel such that the information transmitted is present only along a finite number of orthogonal frequencies.

The present disclosure combines advantages of both Single-carrier Transmission (SCT) and Multi-Carrier Transmission (MCT) systems (e.g. Orthogonal Frequency Division Multiplexing (OFDM) systems).

We claim:
1. A transmitter of a communication system comprising:
a plurality of circuits configured to implement a plurality of modules, said plurality of modules including:
   a block generation module configured to generate a plurality of blocks, each block comprising N symbols from a set of symbols received from a client layer, N being a number of transmit symbols, wherein N is greater than one;
   a first serial-to-parallel converter module configured to transmit, for each block, each of the N symbols in parallel;
   a first sample-and-hold based processing module configured to receive the N symbols in parallel, and generate an analog waveform from each of the N symbols of the respective block using N respective sample-and-hold blocks to generate N analog waveforms;

a first modulation module configured to modulate the N analog waveforms with respective N product modulators based on N respective sinusoidal waves of different frequencies to generate N modulated waveforms;

a first adder module configured to sum the N modulated waveforms in a first adder to obtain a single analog waveform;

a second serial-to-parallel converter module configured to receive N samples taken from the single analog waveform;

a second sample-and-hold based processing module configured to receive the N samples in parallel, and generate a second analog waveform from each of the N samples using a second set of N respective sample-and-hold blocks to generate a second set of N analog waveforms;

a second modulation module configured to modulate the second set of N analog waveforms with a second set of N product modulators based on a second set of N respective sinusoidal waves of different frequencies to generate a second set of N modulated waveforms; and a second adder module configured to sum the second set of N modulated waveforms in a second adder to obtain a final analog waveform to be transmitted to a receiver.

2. The transmitter of claim 1, wherein the sinusoidal waves comprise any or a combination of Sine waves or Cosine waves.

3. The transmitter of claim 1, wherein the different frequencies comprise multiplication of frequency w up to N*w.

4. The transmitter of claim 1, wherein the transmitter further comprises an amplification module configured to amplify the final analog waveform before being sent to the receiver.

5. The transmitter of claim 1, wherein each symbol comprises any or a combination of a real part and an imaginary part, wherein each of the real part and the imaginary part are separated and processed independently, and wherein in case the real part is processed, sinusoidal waves are Cosine waves, and wherein in case the imaginary part is processed, sinusoidal waves are Sine waves.

6. The transmitter of claim 5, wherein final analog waveform of the real part and final analog waveform of the imaginary part are added to obtain RF wave to be transmitted.

7. The transmitter of claim 1, wherein the set of symbols are generated from information that is to be transmitted by the transmitter to the receiver, and wherein the set of symbols are generated based on action of any or a combination of QPSK, BPSK, 8-PSK, and 64-QAM, on the information to be transmitted, and including OFDM samples from a set of OFDM samples.

8. The transmitter of claim 1, wherein the transmitter further comprises a sampling module configured to retrieve the N samples from the single analog waveform, and transmit the N samples to the second serial-to-parallel converter module.

9. The transmitter of claim 1, wherein the receiver comprises:

a plurality of circuits configured to implement a plurality of modules, said plurality of modules including:

a first integration module configured to process the final analog waveform with respect to N integrator blocks to generate the N samples, each integrator block being specific for a sinusoid of a particular frequency;

a first parallel-to-serial converter module configured to process the N samples to generate a discrete-time signal having the N samples;

a first Digital-to-Analog Converter module configured to process the discrete-time signal to generate the single analog waveform;

a second integration module configured to process the single analog waveform with a second set of N integrator blocks to generate the N symbols, wherein each integrator block of the second set of N integrator blocks being specific for a sinusoid of a particular frequency; and a second parallel-to-serial converter module configured to process the N symbols to generate a second discrete-time signal having the N symbols.

10. The transmitter of claim 1, wherein the receiver further comprises a filter module configured to receive the final analog waveform and process the final analog waveform to remove effect of channel and receiver noise.

11. The transmitter of claim 1, wherein the transmitter is operatively coupled with the receiver through a communication channel.

12. The transmitter of claim 1, wherein the transmitter and the receiver are configurable in any or a combination of Inverse Discrete Fourier Transform (IDFT), Discrete Fourier Transform (DFT), Fast Fourier Transform (FFT), Inverse Fast Fourier Transform (IFFT), Digital-to-Analog Converters (DAC), Analog-to-Digital Converters (ADC), and Bandpass Notch filter.

13. A method for transmitting information from a transmitter to a receiver along a channel comprising the steps of:

generating, at a transmitter, a plurality of blocks, each block comprising N symbols from a set of symbols received from a client layer, N being a number of transmit symbols, wherein N is greater than one;

transmitting, at the transmitter, for each block, each of the N symbols in parallel;

receiving, at the transmitter, the N symbols in parallel, and generating an analog waveform from each of the N symbols of the respective block using N respective sample-and-hold blocks to generate N analog waveforms;

modulating, at the transmitter, the N analog waveforms with respective N product modulators based on N respective sinusoidal waves of different frequencies to generate N modulated waveforms;

summing, at the transmitter, the N modulated waveforms in a first adder to obtain a single analog waveform;

receiving, at the transmitter, N samples taken from the single analog waveform;

receiving, at the transmitter, the N samples in parallel, and generate a second analog waveform from each of the N samples using a second set of N respective sample-and-hold blocks to generate a second set of N analog waveforms;

modulating, at the transmitter, the second set of N analog waveforms with a second set of N product modulators based on a second set of N respective sinusoidal waves of different frequencies to generate a second set of N modulated waveforms; and summing, at the transmitter, the second set of N modulated waveforms in a second adder to obtain a final analog waveform to be transmitted to a receiver.

14. The method of claim 13, wherein the method further comprises the steps of processing, at the receiver, the final analog waveform with respect to N integrator blocks to generate the N samples, each integrator block being specific for a sinusoid of a particular frequency;

processing, at the receiver, the N samples to generate a discrete-time signal having the N samples;

processing, at the receiver, the discrete-time signal to generate the single analog waveform;

processing, at the receiver, the single analog waveform with a second set of N integrator blocks to generate the N symbols, wherein each integrator block of the second set of N integrator blocks being specific for a sinusoid of a particular frequency; and processing, at the receiver, the N symbols to generate a second discrete-time signal having the N symbols.

\* \* \* \* \*